Patented Jan. 29, 1935

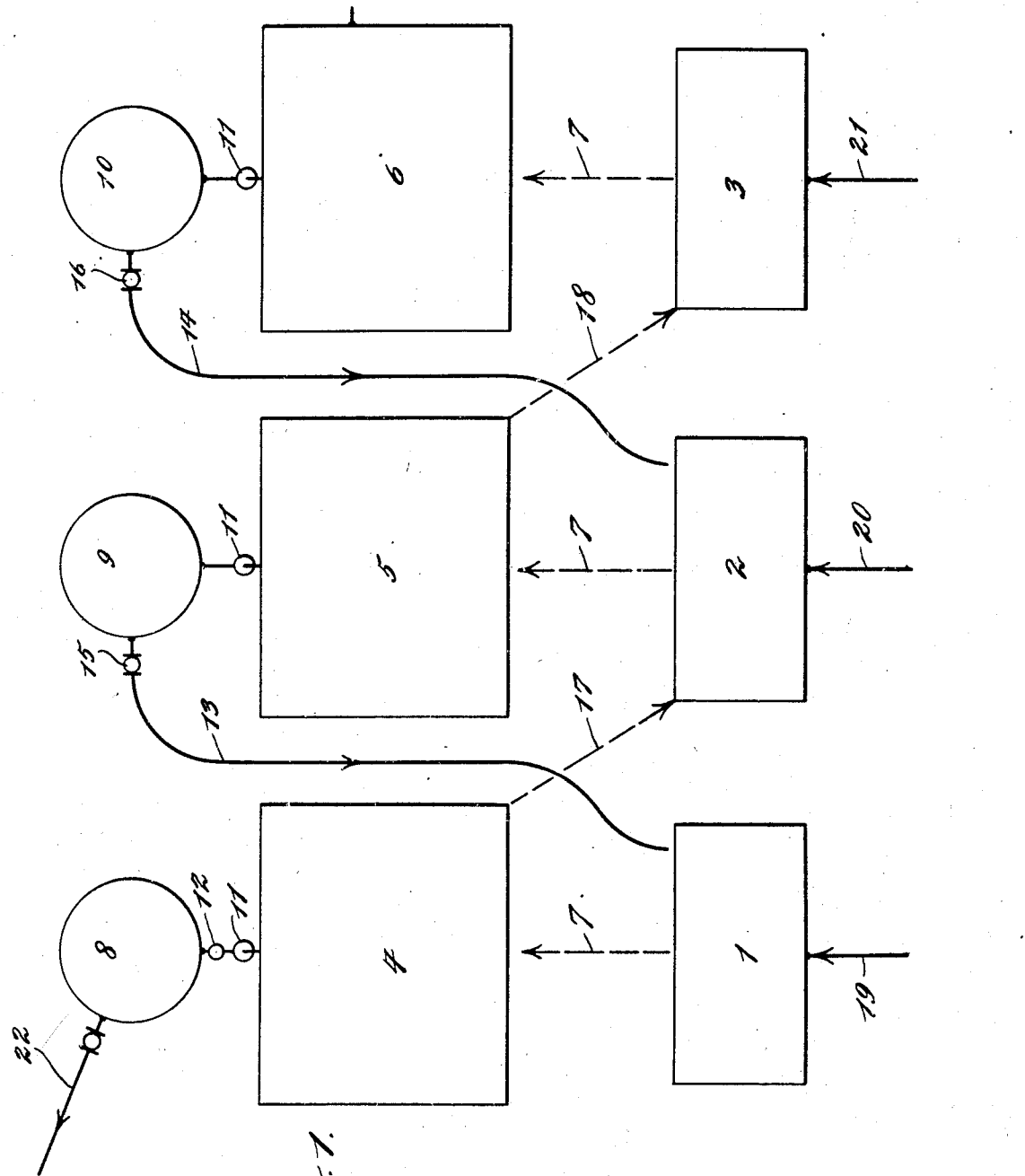

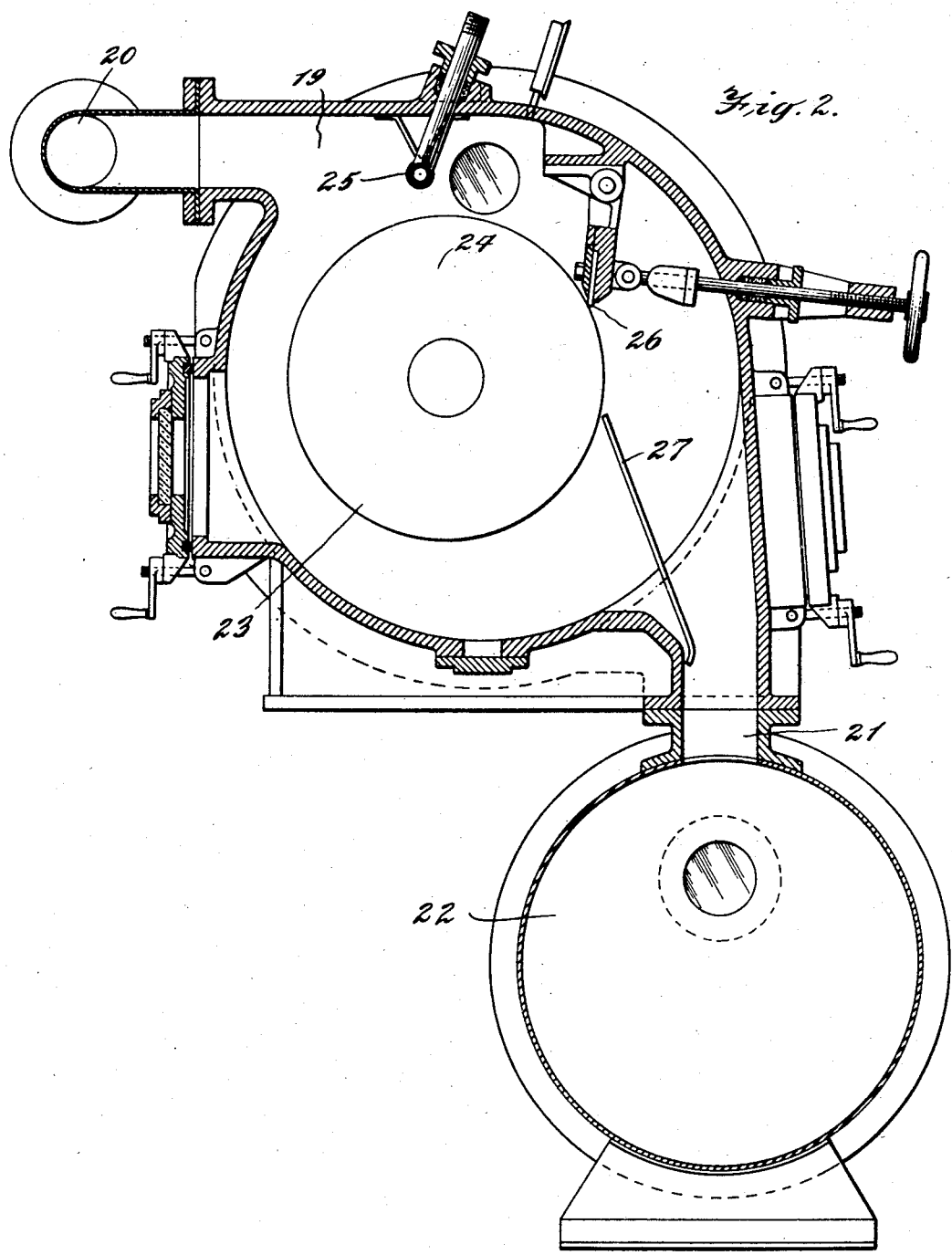

1,989,077

UNITED STATES PATENT OFFICE 1,989,077

METHOD OF PREPARING COFFEE EXTRACT

Otto Paul Curt Bredt, New York, N. Y., assignor to Straitway Coffee, Incorporated, Keyport, N. J., a corporation of Delaware Application January 14, 1930, Serial No. 420,678

2 Claims. (Cl. 99—11)

This invention relates to a novel and improved method of preparing a highly concentrated coffee extract which may be reduced to a dry or powdered form. The dry or powdered product is readily soluble in water.

According to prior art practices, in making a coffee extract, it has been the custom to percolate the ground coffee bean with hot or cold solutions either in one stage or in successive stages. This method requires water or other liquid having about 1½ times the weight of the coffee, a large amount of which must later be evaporated, and requires a considerable length of time. If done rapidly the yield is decreased because the valuable ingredients of the coffee are not extracted from the bean, and if a longer time is taken, in order to extract these ingredients, then valuable ingredients are lost due to escape of the aroma, the aroma carrying with it may of the most valuable of the ingredients.

If the percolation is done with hot water, more of the aroma escapes.

The solution obtained by percolation is a liquid containing a large amount of water with respect to the amount of coffee, and this must be concentrated before sale. The amount of concentration already present depends upon the number of successive percolations to which the coffee has been subjected. If the concentration is high, the solution is put into a dryer such as a vacuum drum dryer and reduced to powder form, whereas if the concentration is low, the concentration must be increased by a preliminary evaporation before being put into the dryer, to bring the product within the range of consistency which the dryer can operate.

If the same batch of coffee has been subjected to successive percolations, the yield is relatively high, and if successive batches of coffee have been subjected to percolation with the same liquid, a high concentration and yield is obtained, but because of the time consumed, a large amount of the aroma has escaped. On the other hand, in the second instance, where there has been only a small number of percolations, and where the product has to be subjected to evaporation before entering the dryer, the yield is small, and here too a large part of the aroma will be lost, in this instance the aroma being lost in large degree in the preliminary evaporation before entering the dryer.

According to my invention, I preserve the aroma both by decreasing the time taken in the treatment, and by increasing the concentration, thereby preserving the aroma and other valuable ingredients and increasing the yield.

In the accompanying drawings, in which I have illustrated certain apparatus which may be used to advantage in the practice of the invention;

Fig. 1 is a diagrammatic floor plan showing an arrangement of apparatus by means of which the method may be practiced.

Fig. 2 is a vertical section through an improved vacuum drum dryer which also may be used to advantage.

Referring now to Fig. 1, I have shown therein an apparatus for practicing a series of steps, each step consisting in the saturation of a batch of coffee beans and the subjection of the saturated batch to a high pressure. The details of the apparatus may vary quite widely, without affecting the invention, and therefore I have merely indicated the location of the various parts of the apparatus. At 1, 2 and 3, are shown mixers, in which coffee beans may be saturated, and after saturation the batches are moved respectively to the presses 4, 5 and 6, this movement of the batches being indicated by the arrows 7.

Connected to each press is a tank, these tanks being designated 8, 9 and 10, respectively. The liquor from each press may be forced into the respective tank by means of pumps 11, one of which is located in each line between a press and tank. In the line between the press 4 and the tank 8 is a filter 12. There is also provided a connection 13 from the tank 9 to the mixer 1, and a connection 14 from the tank 10 to the mixer 2, these connections being provided with valves 15 and 16. The arrows 17 and 18 indicate movement of cakes from presses 4 and 5 to the mixers 2 and 3, respectively, as will be more fully described presently.

When the apparatus is first started, the first step is to saturate ground coffee beans with water in the mixer 1, the water being supplied at 19. The ratio of coffee to water is about 1:1½, this being about the proportion necessary to saturate the beans. The saturated coffee is then conveyed to the press 4, as indicated by the arrow 7, and subjected to a high pressure of about 500 lbs. per square inch. This will largely separate the dissolved parts of the coffee beans, together with the oily substances from the remaining fibre. This remaining fibre I then convey to the mixer 2, this movement being indicated by the arrow 17, and in this mixer the fibre or cake is saturated again, this time with hot water supplied at 20 with about the same proportions by weight of coffee and water as in the first mixture.

After saturation, the cake is conveyed to the press 5, and again subjected to high pressure, the liquor being pumped from the press to the tank 9. This liquor may be conveyed through the connection 13 to the mixer 1 and there used to saturate a fresh batch. The cake from the press 5 is conveyed as indicated by the arrow 18, to the mixer 3, where it is again saturated, this time preferably with boiling water supplied at 21, the proportions by weight of coffee and water being substantially the same as before. After saturation, the batch from the mixer 3 is conveyed to the press 6, and again subjected to high pressure. The liquor from this pressing is pumped to the tank 10 and may be used in the mixer 2.

The above describes the first operation when the apparatus is started. It is obvious, however, that the apparatus is intended for continuous operation over long periods. In continuous operation, the process may be described as follows:

A fresh bath of coffee beans, preferably ground, is supplied to the mixer 1, where it is mixed with liquor supplied from the tank 9. The batch is then conveyed to the press 4 for extraction of the liquid therefrom, and then the cake is conveyed to the mixer 2 for saturation with liquor from the tank 10. The saturated cake is then treated in the press 5 and conveyed to the mixer 3 for saturation with fresh boiling water. In other words, the process first described is continuously repeated, except that the liquid used for saturation of the coffee in mixers 1 and 2 is liquor extracted from previously treated batches.

The result is that a batch of coffee beans is subjected to successive saturations with the same liquid, the last saturation being with fresh water and the first saturation being with liquor extracted from preceding batches. The operation on the fresh batch of beans at the first pressing in the press 4, serves to extract the major part of the soluble matter, and the second pressing extracts the major part of the remaining soluble solids, such as the coffeo-tannic acid compounds, caffeines, or in other words the substances which may be called the bitter ingredients. The last pressing with boiling water at 100° C. extracts the remaining ingredients and insures a high yield but is not always necessary.

The extract which has been passed from the press 4 through the filter 12 to the tank 8 is now highly concentrated and is ready for drying, and the drying should be performed at once. While I prefer to dry the extract, it is, of course, to be understood that if desired the extract may be used in its liquid form. The concentrate at this time contains between 15 and 40% of the solids which contain the valuable ingredients of the coffee, particularly the ingredients making the aroma. In order to avoid the loss of aroma and other valuable ingredients, the concentrate is conducted directly from the tank 8 through the pipe 22 to the dryer, which may be a vacuum dryer of any well-known type, although preferably I prefer the form of dryer shown in Fig. 2.

In Fig. 2, I have shown a chamber 19 connected at 20 to an exhaust for forming a vacuum in the chamber, and connected at 21 to the receptacle 22. Within the dryer is a revolving drum 23, preferably made of highly polished bronze, revolving on a horizontal axis in the direction indicated by the arrow 24. Disposed in the top of the chamber is a spray 25 designed to spray the liquid coffee extract on to the top of the drum, preferably at one side of the vertical plane passing through the horizontal axis of the drum. It will be seen that the drum rotates in a direction such that the top of the drum is moving from this plane toward the spray, so that the sprayed material has practically no chance of working down to the right of the drum, as viewed in Fig. 2, but will be carried by the drum in a counter-clockwise direction. The extract will be dried to a powder during movement of the drum, and will be scraped therefrom as by a knife 26, and may be received on an apron 27 which will guide it into the receptacle 22.

By my invention, I materially shorten the time during which the coffee remains in solution. This is important, because while in solution the coffee loses its flavor very quickly. At the same time, I obtain a high yield while retaining the aroma and other valuable ingredients of the coffee beans.

I claim:

1. The method of making a product containing the valuable ingredients of coffee, which comprises performing a series of three successive steps on a batch of coffee beans to obtain a liquid extract, each step consisting in saturating said batch with a liquid and subjecting the batch to pressure to extract a liquor therefrom, the liquid used in the last step being fresh boiling water, that used in the second step being hot liquor from the third step, and that used in the first step being cold liquor from the second step.

2. The method of making a product containing the valuable ingredients of coffee by a continuous operation, which comprises saturating a fresh batch of roasted coffee with aqeous liquor obtained from a second extraction treatment of another batch of roasted coffee, pressing the extract out of said first-named batch, saturating the pressed solids of said first-named batch with hot aqueous liquor, again pressing said first-named batch and using the extract therefrom to extract a fresh batch of roasted coffee and so on repeatedly.

OTTO PAUL CURT BREDT.